United States Patent
Bruce et al.

[11] Patent Number: 5,956,743
[45] Date of Patent: Sep. 21, 1999

[54] TRANSPARENT MANAGEMENT AT HOST INTERFACE OF FLASH-MEMORY OVERHEAD-BYTES USING FLASH-SPECIFIC DMA HAVING PROGRAMMABLE PROCESSOR-INTERRUPT OF HIGH-LEVEL OPERATIONS

[75] Inventors: Ricardo H. Bruce, Union City; Rolando H. Bruce, South San Francisco; Earl T. Cohen, Fremont, all of Calif.

[73] Assignee: Bit Microsystems, Inc., Fremont, Calif.

[21] Appl. No.: 08/939,602

[22] Filed: Sep. 29, 1997

Related U.S. Application Data

[63] Continuation-in-part of application No. 08/918,203, Aug. 25, 1997.
[51] Int. Cl.$^6$ .............................................. G06F 11/08
[52] U.S. Cl. .................................... 711/103; 714/773
[58] Field of Search .............................. 711/103, 156; 714/5, 6, 8, 42, 52, 54, 758, 763, 766, 773, 764, 785, 770

[56] References Cited

U.S. PATENT DOCUMENTS

| | | | |
|---|---|---|---|
| 5,228,046 | 7/1993 | Blake et al. | 714/761 |
| 5,297,148 | 3/1994 | Harari et al. | 371/10.2 |
| 5,379,401 | 1/1995 | Robinson et al. | 395/425 |
| 5,384,789 | 1/1995 | Tomita | 714/755 |
| 5,388,083 | 2/1995 | Assar et al. | 365/218 |
| 5,432,748 | 7/1995 | Hsu et al. | 365/230.01 |
| 5,448,577 | 9/1995 | Wells et al. | 371/10.1 |
| 5,448,578 | 9/1995 | Kim | 714/766 |
| 5,479,638 | 12/1995 | Assar et al. | 395/430 |
| 5,500,826 | 3/1996 | Hsu et al. | 365/230.01 |
| 5,509,134 | 4/1996 | Fandrich et al. | 395/430 |
| 5,513,138 | 4/1996 | Manabe et al. | 365/185.33 |
| 5,524,231 | 6/1996 | Brown | 395/428 |
| 5,530,828 | 6/1996 | Kaki et al. | 395/430 |
| 5,535,328 | 7/1996 | Harari et al. | 395/182.05 |
| 5,559,956 | 9/1996 | Sukegawa | 395/182.06 |
| 5,568,439 | 10/1996 | Harari | 365/218 |
| 5,572,466 | 11/1996 | Sukegawa | 365/185.33 |
| 5,594,883 | 1/1997 | Pricer | 395/440 |
| 5,602,987 | 2/1997 | Harari et al. | 395/182.06 |
| 5,603,001 | 2/1997 | Sukegawa et al. | 395/430 |
| 5,606,529 | 2/1997 | Honma et al. | 365/230.03 |
| 5,619,470 | 4/1997 | Fukumoto | 365/228 |
| 5,627,783 | 5/1997 | Miyauchi | 365/185.33 |
| 5,640,349 | 6/1997 | Kakinuma et al. | 365/185.33 |
| 5,684,944 | 11/1997 | Lubbers et al. | 714/6 |
| 5,754,567 | 5/1998 | Norman | 714/773 |
| 5,793,774 | 8/1998 | Usui et al. | 714/719 |
| 5,841,795 | 11/1998 | Olarig et al. | 714/768 |

*Primary Examiner*—Eddie P. Chan
*Assistant Examiner*—Gary J. Portka
*Attorney, Agent, or Firm*—Stuart T. Auvinen

[57] ABSTRACT

A flash-memory system adds system-overhead bytes to each page of data stored in flash memory chips. The overhead bytes store system information such as address pointers for bad-block replacement and write counters used for wear-leveling. The overhead bytes also contain an error-correction (ECC) code when stored in the flash-memory chips. A DRAM cache stores the pages of data as enlarged pages with the overhead bytes, even though the enlarged pages are not aligned to a power of 2. When an enlarged page is read out of a flash-memory chip, its ECC code is immediately checked and the ECC code in the overhead bytes is replaced with a syndrome code and stored in the DRAM cache. A local processor for the flash-memory system then reads the syndrome code in the overhead bytes and repairs any error using repair information in the syndrome. The overhead bytes are stripped off when pages are transferred from the DRAM cache to a host. The host can be notified early by an intermediate interrupt after a programmable number of pages have been read. This improves performance since the host does not have to wait for an entire block of pages to be read.

20 Claims, 8 Drawing Sheets

TRANSPARENT MANAGEMENT AT HOST INTERFACE OF FLASH-MEMORY OVERHEAD-BYTES USING FLASH-SPECIFIC DMA HAVING PROGRAMMABLE PROCESSOR-INTERRUPT OF HIGH-LEVEL OPERATIONS

RELATED APPLICATION

This application is a continuation-in-part of the co-pending applications for "Unified Re-Map and Cache-Index Table with Dual Write-Counters for Wear-Leveling of Non-Volatile Flash RAM Mass Storage", filed Aug. 25, 1997, U.S. Ser. No. 08/918,203. This application is related to "Expandable Flash-Memory Mass-Storage Using Shared Busy Lines and Intermediate Flash-Bus Between Device-Specific Buffers and Flash-Intelligent DMA Controllers" having the same filing date as the present application, U.S. Ser. No. 08/939,601, now U.S. Pat. No. 5,822,251.

BACKGROUND OF THE INVENTION

1. Field of the Invention

This invention relates to non-volatile flash-memory systems, and more particularly to management of overhead bytes and host interrupts.

2. Description of the Related Art

A traditional storage medium in computer systems is the hard disk. More recently hard disks are being replaced by non-volatile semiconductor memory. An array of non-volatile random-access memories (NVRAM's) or non-volatile flash memories substitutes for the hard-disk storage. These memory devices use electrically-erasable programmable read-only-memory (EEPROM) technology for storage cells. Floating polysilicon gates in these storage cells retain charge and state when power is lost, providing non-volatile storage. These flash-memory systems are frequently used as a mass-storage replacement for a hard disk on a personal computer and are thus sometimes referred to as a flash "disk", even though no rotating disks are used.

Flash-memory chips contain memory arrays of EEPROM cells that are arranged into blocks of pages. A 64 Mbit flash chip typically has 16-page blocks and 512-byte pages, which matches the sector size for IDE and SCSI hard disks. The entire page is written at the same time; individual bytes are not written. The page must be cleared of any previous data before being written; clearing is accomplished by a flash erase cycle. An entire block of pages (typically 16 pages) is erased at once. Thus a block of 16 pages must be erased together, while all 512 bytes on a page must be written together.

Each page contains a 512-byte data field and an additional 16-byte pointer or system-overhead field. The 16-byte overhead field has traditionally been used to store an address pointer to another flash-memory page. This pointer is used when the flash page has become worn out and has an error. The new page pointed to contains the replaced data.

The co-pending application, "Unified Re-Map and Cache-Index Table with Dual Write-Counters for Wear-Leveling of Non-Volatile Flash RAM Mass Storage", U.S. Ser. No. 08/918,203, described an address re-mapping table for use with a flash-memory system. This re-mapping table rather than the pointers in the overhead bytes is used for translation. All incoming addresses from a host are translated to physical block addresses of blocks within the flash memory. The re-mapping table also translates addresses away from faulty or worn flash-memory blocks.

By providing a unified re-mapping table that translates all incoming addresses, complex pointers do not have to be stored in the system-overhead bytes of a flash-memory page. Using block-level rather than page-level re-mapping also frees up more of the overhead bytes for use by an error-correction code (ECC). Having more bytes available for ECC allows for better, more effective codes that are able to correct more errors. These features improve performance and reliability.

Overhead Bytes Complicate System

Address management is complicated by the overhead bytes. Each 512-byte page must be expanded to 528 bytes to accommodate the 16-byte overhead field that is stored with the flash page. Since 528 bytes is not a power of 2, these enlarged pages are no longer aligned. Generation of the information in the overhead bytes and their formatting must also be performed. This generation and formatting ideally should be transparent to the host so that the host's performance is not degraded by formatting and non-aligned data transfers.

Flash-Specific DMA

The co-pending application, U.S. Ser. No. 08/939,601, disclosed an expandable flash-memory system. Flash-specific direct-memory access (DMA) controllers were used to transfer data from a DRAM cache to the flash-memory chips through buffer chips. These DMA controllers accepted block-level requests from a local processor. These block-level requests were translated by the DMA to a sequence of page-level commands that the flash-memory chips could accept.

Since blocks contain such a large amount of data, the host may wait for a relatively long time until the block of data is read from the flash-memory chips. Often the host is only interested in a small portion of the data in the block, such as the data on one of the 16 pages. Although the host may desire the data on the first or second page, the host must wait until all 16 pages of the block are read from the flash-memory chips and into the DRAM cache. Once all pages are read, then the host is notified that it can read the desired data. Using a write-back cache on a block basis requires that all pages in a block be read from the flash-memory chips.

It is desired to reduce the delay until the host can read data from a flash-memory system. It is desired to signal the host that the data is ready before the entire block of data has been read from the flash-memory chips. It is further desired to generate and format the overhead bytes of a flash page in a manner that is transparent to the host.

SUMMARY OF THE INVENTION

A flash-memory system transparently manages system-overhead bytes. The flash-memory system has a plurality of non-volatile flash-memory chips. Each flash-memory chip stores a plurality of blocks of pages. Each page has a data portion and system-overhead bytes for the page.

A direct-memory access (DMA) controller accesses the flash-memory chips by generating commands to the flash-memory chips. A volatile cache memory stores pages of data transferred from the flash-memory chips by the DMA controller. The volatile cache memory is organized to store system-overhead bytes for a page with the data portion of the page. A host interface receives commands from a host and transfers data to the host from the flash-memory system.

An overhead-byte generator is coupled to the host interface. It appends dummy overhead bytes to each page of data from the host. The dummy overhead bytes are written to the volatile cache memory as the system-overhead bytes when the data portion of the page is transferred from the host to the volatile cache memory. The overhead-byte generator removes the system-overhead bytes from the page when the page is transferred from the volatile cache memory to the host interface for reads by the host.

Thus the system-overhead bytes are stored in the volatile cache memory and in the flash-memory chips but not transferred to or from the host.

In further aspects of the invention the system-overhead bytes have a system field and an error-correction code (ECC) field that stores ECC for the data portion of the page. The system field is located immediately after the data portion of the page. The ECC stored in the ECC field includes error correction for the data portion and for the system field.

In further aspects the system fields from each page in a block of pages are combined into a system-block field. The system-block field contains system information for all pages in the block. Thus system fields from pages in the block are combined to store the system information for the block of pages, but the ECC field for each page stores ECC for the page.

In still further aspects the system information stored in the system-block field includes a write counter that indicates a number of writes to a physical block of pages in the flash-memory chips. An address field stores an address for the block. The address field stores a logical-block address (LBA) for the block. The logical-block address is a portion of a logical address used by the host to address the block rather than a physical address of the block used to access the flash-memory chips. Thus the system-overhead bytes store the portion of the logical address rather than a physical address for the block.

In still further aspects the DMA controller further has an error-correction code (ECC) checker that receives the data portion and the system-overhead bytes from the flash-memory chips. It detects errors in the data portion read from a page in the flash-memory chips. A syndrome generator in the ECC checker generates a syndrome code that indicates when no errors are detected. It indicates a location of an error within the page when an error is detected. An overwriting means is coupled to the syndrome generator to overwrite the ECC field in the system-overhead bytes with the syndrome code. Thus the ECC field is overwritten by the syndrome code.

In other aspects the volatile cache memory stores the syndrome code while the flash-memory chips store the error-correction code (ECC) in the system-overhead bytes for the page.

DETAILED DESCRIPTION

The present invention relates to an improvement in flash-memory systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that transparent management of the overhead bytes can be accomplished by storing the overhead bytes in the DRAM cache within the flash-memory system. Data written in from the host is first appended with the overhead bytes and then stored in the DRAM cache before being written to the flash-memory chips. Since error-correction code (ECC) generation is complex and time-consuming, dummy ECC is written in to the overhead bytes in the DRAM cache and later generated when writing to the flash-memory chips.

The inventors have also realized that the flash-specific direct-memory access (DMA) controllers can be modified to generate an interrupt to the host after a predetermined number of pages in the block have been read. Thus the host can be interrupted after the first four pages have been read to the DRAM cache, but before all 16 pages are read from the flash-memory chips.

Figure 1:
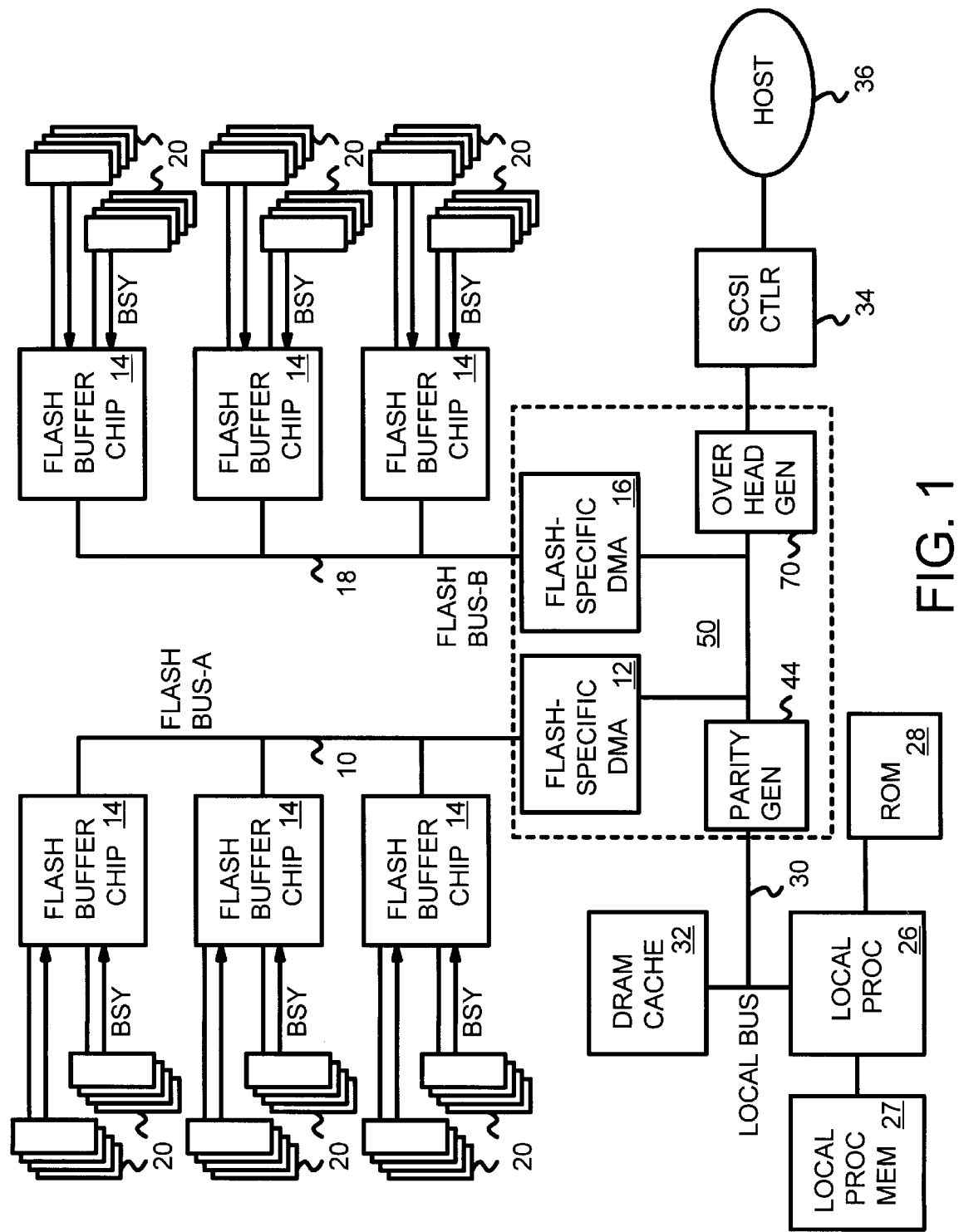
FIG. 1 is a flash-disk system with transparent management of flash-overhead bytes.

Flash-Disk System—FIG. 1

FIG. 1 is a flash-disk system with transparent management of flash-overhead bytes. Banks of flash-memory chips 20 connect to flash buffer chips 14, which are connected to flash busses 10, 18. Expansion of the memory capacity occurs when additional flash buffer chips are connected to flash busses 10, 18.

Flash specific DMA controllers 12, 16 are preferably contained in a single Application-Specific Integrated Circuit (ASIC) 50. ASIC 50 connects DMA controllers 12, 16 to small-computer system interface (SCSI) controller 34 and to local bus 30. Local bus 30 connects DRAM cache 32 and local processor 26 to ASIC 50.

Requests from host 36 are received by SCSI controller 34 and driven onto local bus 30 through overhead-byte generator 70 and parity generator 44. The flash-memory system responds to these host requests by storing host data and the overhead bytes generated by generator 70 into DRAM cache 32 for writes. Thus the flash data is stored in DRAM cache 32 as 528-byte pages rather than aligned 512-byte pages. System firmware allows for arbitrary starting and ending points of a page in the DRAM cache. Local processor 26 then writes system information to the overhead bytes of the pages stored in DRAM cache 32 including wear-leveling counters and address pointers for the block. The overhead bytes stored in DRAM cache 32 are replaced by an ECC code as the data from DRAM cache 32 is sent to flash-memory chips 20 for storage.

For read requests from host 36, local processor 26 programs DMA controllers 12, 16 to read data from flash-memory chips 20 to DRAM cache 32, if the data is not currently in DRAM cache 32. For reads, overhead-byte generator 70 strips off the 16 overhead bytes from every page sent from DRAM cache 32 to host 36.

ROM 28 contains firmware code of routines that execute on local processor 26 to respond to host requests. Other system-maintenance routines are stored on ROM 28, such as wear-leveling and copy-back routines. DRAM cache 32 is preferably under firmware control by local processor 26, and thus the local processor's local memory 27 and DRAM cache 32 may share the same physical DRAM chips.

Accesses of flash-memory chips 20 by local processor 26 are initiated by local processor 26 sending a high-level command to one of flash-specific DMA controllers 12, 16. These DMA controllers then generate sequences of command and address bytes, and transfer data. Many sequences may be needed, such as for block reads and writes. A block read requires that many page read sequences be performed, each sequence generally sending command and address bytes to the flash-memory chips through the flash buffer chip. Some flash-memory chips also have a sequential read mode where command and address bytes need only be sent for the first page in a sequence.

The flash-memory chips being read, written, or erased remain busy for some period of time after the command and address bytes are sent. The flash buffer chips combine and send the busy signals from multiple flash-memory chips to the DMA controller. Once the busy signal is de-asserted, indicating that the flash-memory chip is ready, the DMA controller continues the operation, perhaps reading the data or moving on to the next page in the block. Finally, once all flash operations have finished, the DMA controller signals to local processor 26 that the high-level flash operation is complete.

Figure 2:
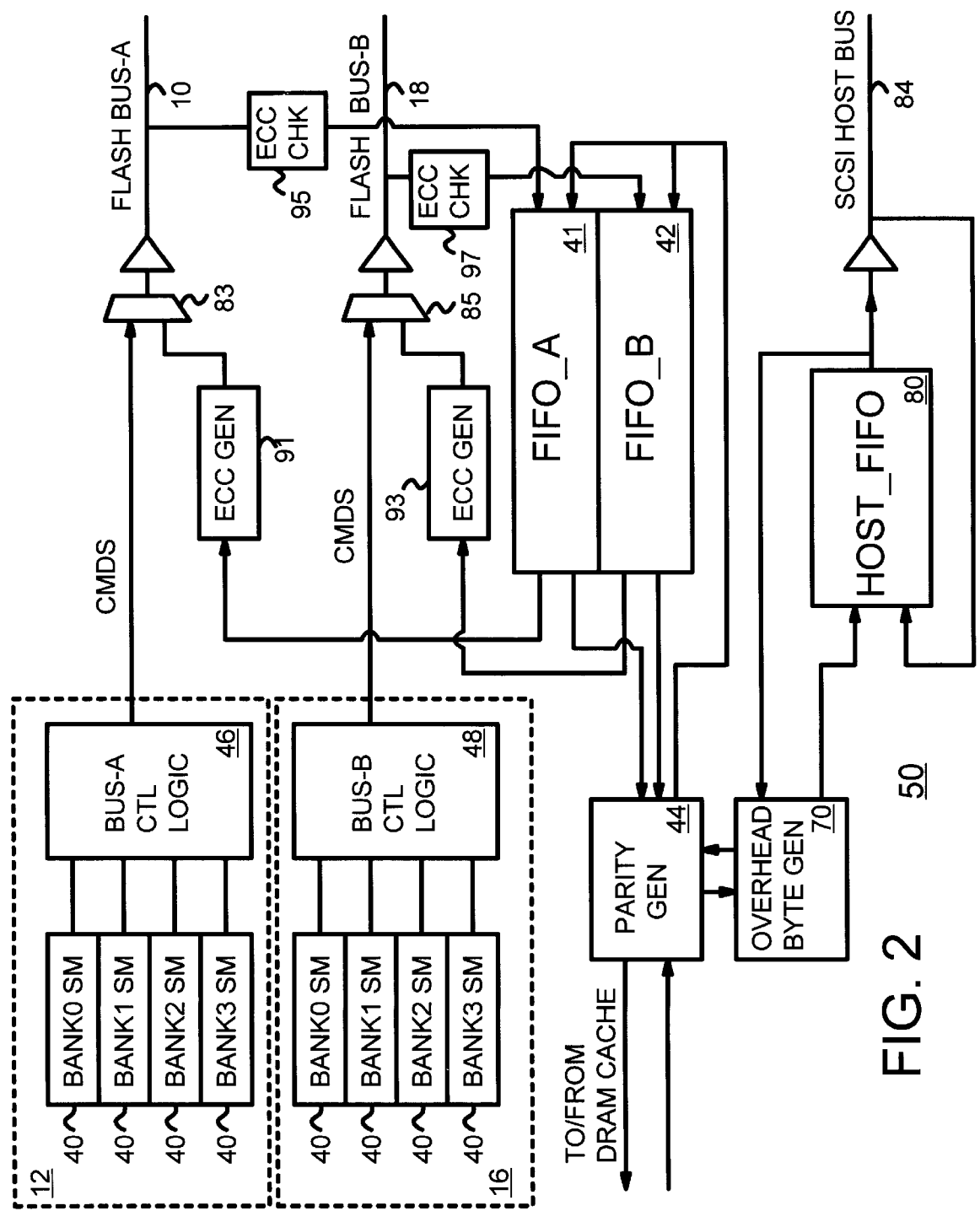
FIG. 2 is a diagram of an ASIC chip containing dual DMA controllers for controlling flash memories and a transparent overhead-byte generator.

Flash-Specific DMA—FIG. 2

FIG. 2 is a diagram of an ASIC chip containing dual DMA controllers for controlling flash memories and a transparent overhead-byte generator. Data received from flash busses 10, 18 is buffered by FIFOs 41, 42 before being sent to the DRAM cache. Having separate FIFOs 41, 42 for flash busses 10, 18 allows for independent bus operation. One flash bus can be reading from flash-memory chips while the other is writing to flash-memory chips. Flash data is always sent to and from the DRAM cache rather than directly from the host to the flash memory. Parity circuit 44 adds or checks parity bits for storage in the DRAM cache. FIFOs 41, 42 also buffer data from the DRAM cache before it is written to the flash memory over one of flash busses 10, 18.

Flash bus 10 is controlled by flash-specific DMA controller 12, while flash bus 18 is controlled by flash-specific DMA controller 16. Each DMA controller 12, 16 contains four state machines 40, one for each of four banks of flash-memory chips. Having four state machines allows four flash-memory chips to be accessed at once for each flash bus, for a total of eight flash accesses. The data can be interleaved among the four banks for each flash buffer chip, and also interleaved among chips connected to the two flash busses. Separate state machines 40 allows the eight flash accesses to be in different stages of completion.

Flash bus 10 is driven by bus control logic 46 in DMA controller 12, while flash bus 18 is driven by bus control logic 48 in DMA controller 16. Bus control logic 46, 48 generates command and address bytes or enables reading and writing of FIFOs 41, 42 in response to states entered by state machines 40. Arbitration logic (not shown) determines which state machine 40 currently controls each flash bus, since only one transfer at a time can be performed on a flash bus.

Multiplexers or muxes 83, 85 select address bytes and commands from bus control logic 46, 48, or data from FIFOs 41, 42. This allows both commands and data to be sent over the same flash bus.

Host data from SCSI host bus 84 is buffered by host FIFO 80. Overhead-byte generator 70 adds a 16-byte field to the end of every 512 bytes of host data to generate 528-byte pages for storage in flash memory. Overhead-byte generator 70 can simply generate dummy data for the overhead bytes, allowing the local processor to later write the system information, such as the wear counters and the address pointer.

Overhead-byte generator 70 strips off the 16-byte overhead field for host reads. Since the data is stored as 528-byte pages in the DRAM cache, generator 70 deletes 16 bytes after every 512 bytes from the DRAM cache to the host. Host FIFO 80 stores the data without the overhead bytes and buffers the recurring mis-match in data rates caused by deleting the overhead bytes.

Error-correcting-code (ECC) generators 91, 93 and ECC checkers 95, 97 connect to flash busses 10, 18. A block code, such as a Reed-Solomon code, is used to protect entire pages of data stored in the flash-memory chips and to guard against more than just simple, single-bit errors. When data is being transferred to the flash-memory chips, ECC generators 91, 93 generate the actual ECC code, which replaces the dummy code stored in the page's overhead bytes in the DRAM cache. When data is being transferred from the flash-memory chips, ECC checkers 95, 97 check the ECC stored in the flash-memory chip's overhead bytes. ECC checkers 95, 97 determine if there were any errors, either in the flash-memory chips themselves, or possibly in the interface to or from them. It is possible to design a combined ECC generator/checker unit so that one ECC unit can be used per flash bus.

ECC checkers 95, 97 generate a syndrome code that over-writes the ECC code in the 16-byte overhead field for each page. The syndrome is all zeros when no error was detected in the page by ECC checkers 95, 97. When an error is found, a non-zero syndrome is returned. This non-zero syndrome encodes the location of the error and repair information for simple errors. The local processor reads the syndromes of the pages to determine if the error can be fixed and then uses the repair information to fix the error in the data in the DRAM cache. The local processor can read each page's syndrome code to determine if an error has occurred, or it can be signaled by ECC checkers 95, 97 when an error is detected.

In the preferred embodiment, the completion of a transfer by a DMA controller will signal either a normal completion interrupt when there were no detected ECC errors, or an error completion interrupt when the syndrome of one or more of the pages being transferred was non-zero. In addition to the error interrupt, an ECC error status bit will be set in a status register indicating that the error was an ECC error. The error-interrupt indication, combined with the ECC error status bit, notifies the local processor that it must then check the syndrome of each of the pages that was being transferred to see which one or ones need ECC processing to correct the errors.

Figure 3:
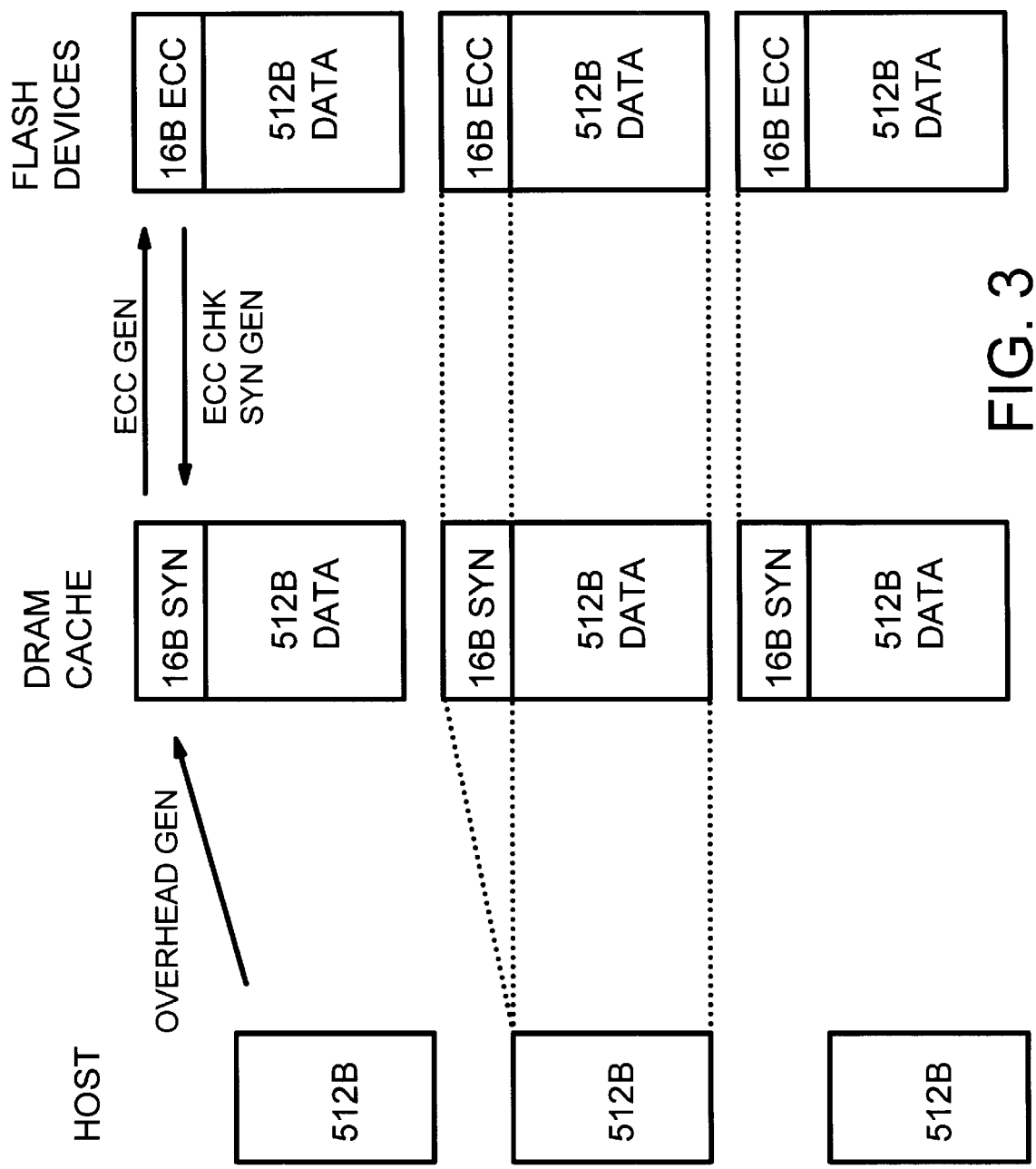
FIG. 3 highlights that pages from the host are expanded for storage in the DRAM cache and the flash memory.

DRAM Cache Stores Expanded Flash Pages—FIG. 3

FIG. 3 highlights that pages from the host are expanded for storage in the DRAM cache and the flash memory. The host's pages are expanded for the overhead bytes and stored as expanded pages in the DRAM cache before the actual ECC is written to the overhead bytes for storage in the flash memory.

Each page from the host has 512 bytes of data. As the data is transferred from the host to the DRAM cache, a 16-byte field is appended to each page. Thus the DRAM cache stores 528-byte expanded pages. These 528-byte pages include 512 bytes of data from the host, and a 16-byte overhead field. The flash-memory chips also store 528-byte pages with 512 data bytes and 16 overhead bytes. The DRAM cache stores the same-sized image as the flash memory, using 528-byte pages.

However, the overhead bytes stored in the DRAM cache are not exactly the same as the overhead bytes stored in the flash memory chips. Initially for data written to the DRAM cache from the host the overhead field in the DRAM contains only dummy information such as all zeros, but later the local processor writes the system information to the overhead bytes. However, the ECC is not generated for pages in the DRAM cache. When pages are transferred from the DRAM cache to the flash memory chips, the actual ECC is generated and written into the overhead bytes. Thus the flash-memory chips contain the actual ECC in the overhead bytes while the DRAM cache has dummy ECC in its overhead bytes for pages of data written to the DRAM cache from the host.

When data is read from the flash-memory chips to the DRAM cache, the ECC in the overhead bytes is checked and a syndrome code over-writes the ECC in the overhead bytes. The syndrome code indicates if an error was detected, and contains location and repair information for the error. The local processor can read the syndrome code and repair the error before the data is sent to the host.

In order to do error correction, the local processor needs access to the syndrome. Storing the syndrome in the DRAM cache for every page may seem excessive, since the syndrome is stored regardless of whether the page came from the flash-memory chips or from the host, or whether the page had errors that need correction. However, this method has several important advantages. First, it is symmetric in that all pages are stored in the same fashion—pages transferred from the host look the same as those transferred from the flash-memory chips. Second, storing the syndrome in the DRAM cache means that there is no limit on how many pages can have errors—there is no separate syndrome storage that could become full. Third, the local processor needs access to at least some part of the overhead bytes in order to update the system information. Fourth, system diagnostics are improved by giving the local processor complete access to the overhead bytes.

Figure 4:
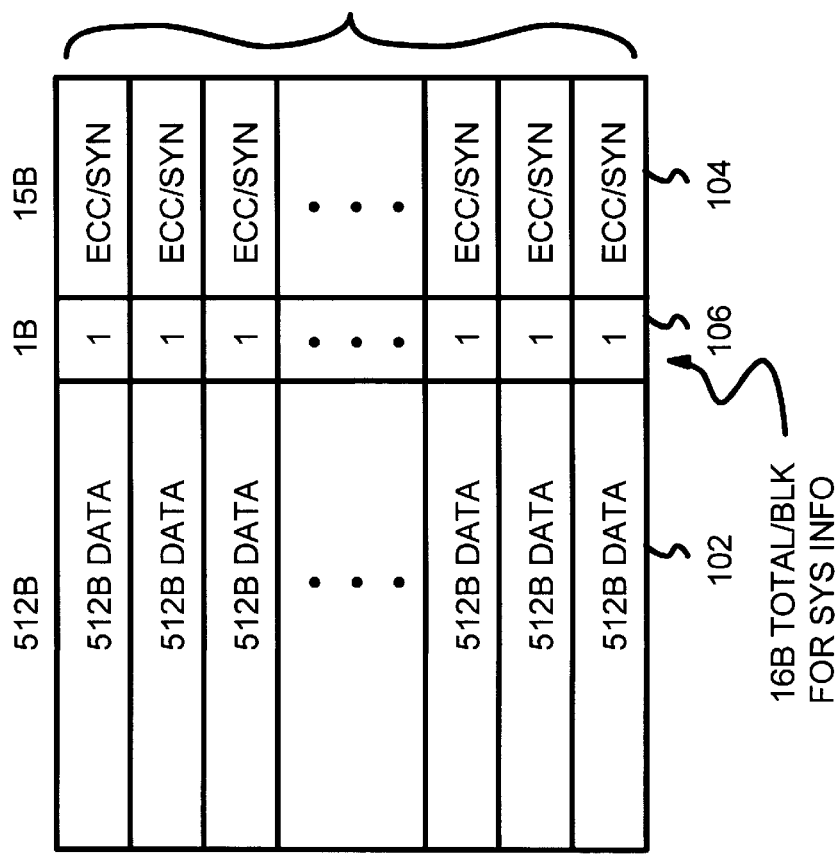
FIG. 4 shows a block of 16 pages with shared overhead bytes for system information and error-correction code.

Block-Granularity for Re-Mapping—FIG. 4

FIG. 4 shows a block of 16 pages with shared overhead bytes for system information and error-correction code. Some failures of the flash memory can be tolerated when an error correction scheme such as Hamming bits, or a Reed-Solomon, block code are used. Error correction allows simple errors of one or a few bytes to be corrected, and longer multi-byte errors to be detected. Error correction is especially useful in flash-memory systems since the storage cells wear out after repeated use.

When individual pages are mapped and replaced for defects, most of the 16-byte pointer field is needed for storing the pointer to the replacement page, and for other system-overhead functions. Fewer bytes are available for error correction, so a weaker error-correcting code must be used.

Conventional wisdom is that the granularity for defect re-mapping be kept as small as possible. Instead, the inventors have realized that more efficient wear-leveling can overcome the drawbacks of disabling an entire block rather than just a page when a bad flash page is detected. As flash-memory sizes increase, the relative loss from block rather than page re-mapping decreases.

A flash block generally has 16 pages, each with a 512-byte data field 102 and a 16-byte pointer field. Only one of the 16 bytes of each page's pointer field are used for mapping, wear-leveling, and other system information, allowing the other 15 bytes to be used for error-correction code (ECC) information for the page. Thus the 16-byte pointer field includes 15-byte ECC field 104 and 1-byte system field 106.

While each ECC field 104 is for a particular page, all 16 system fields 106 for all 16 pages are combined together to form a single 16-byte record for the entire block. This record contains the logical-block address (LBA) that the block is allocated to, and the wear-leveling information for this physical block.

The single 16-byte record for the block, constructed from the 1-byte system fields 106, contains the logical address for the block rather than a pointer to a physical block as in the prior art. Thus a reverse-map rather than a forward map is contained in system fields 106. This reverse map can be used to re-construct the re-mapping table when necessary, although it is not useful for mapping logical addresses to physical addresses, since the physical address (PBA) must be known first to obtain the logical address (LBA).

The bytes of system field 106 are made from the first byte of the 16-byte overhead field for each page. The 512-byte data field 102 and the one-byte system field 106 for each page together form a 513-byte stream. Error correction is applied to this 513-byte stream rather than just to the 512-byte data field 102. This provides a way to protect the system field with the same powerful ECC code used to protect the host data.

Figure 5A:
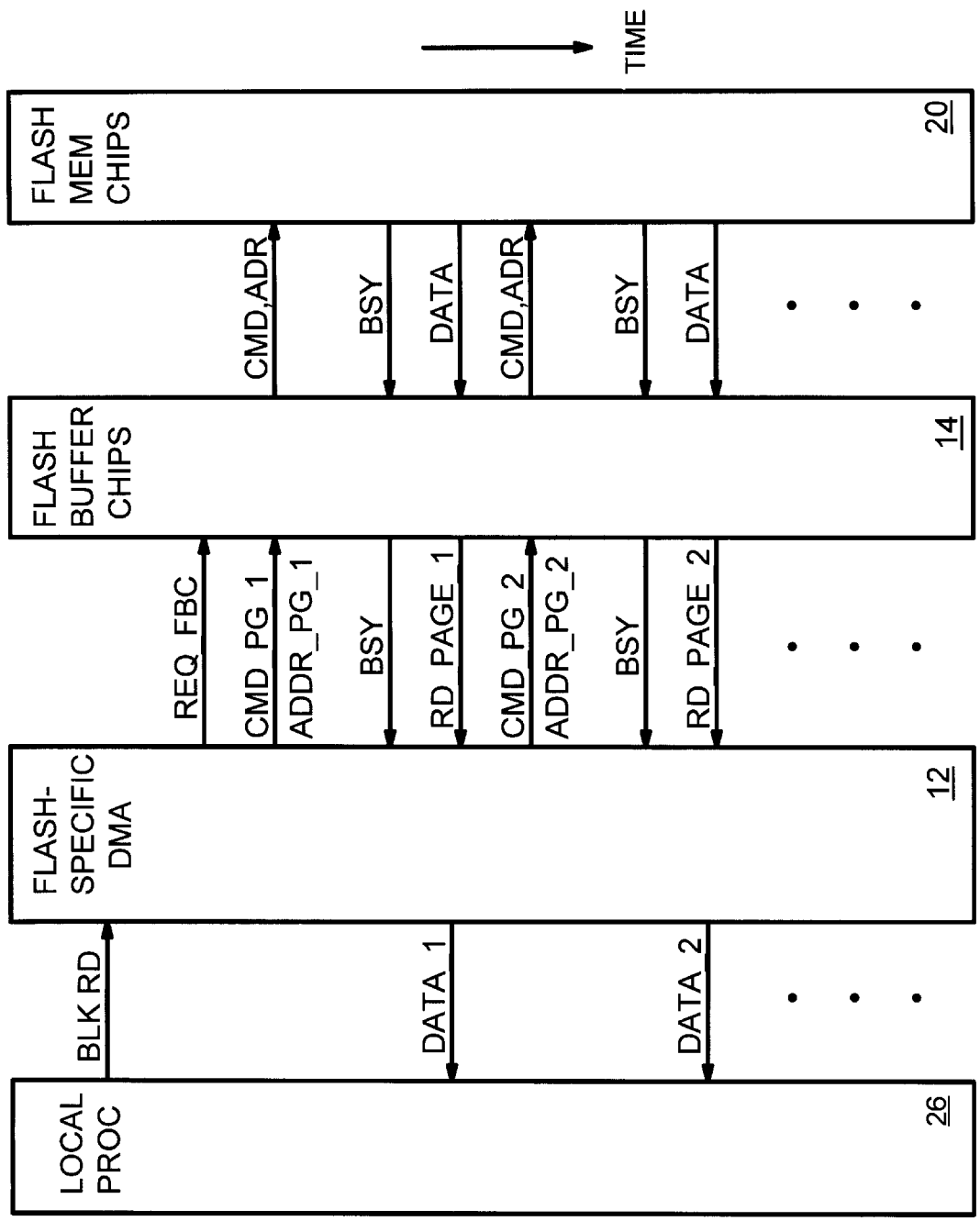
FIGS. 5A, 5B show how a block-read command is converted to a sequence of 16 page reads to the flash-memory chips.
Figure 5B:
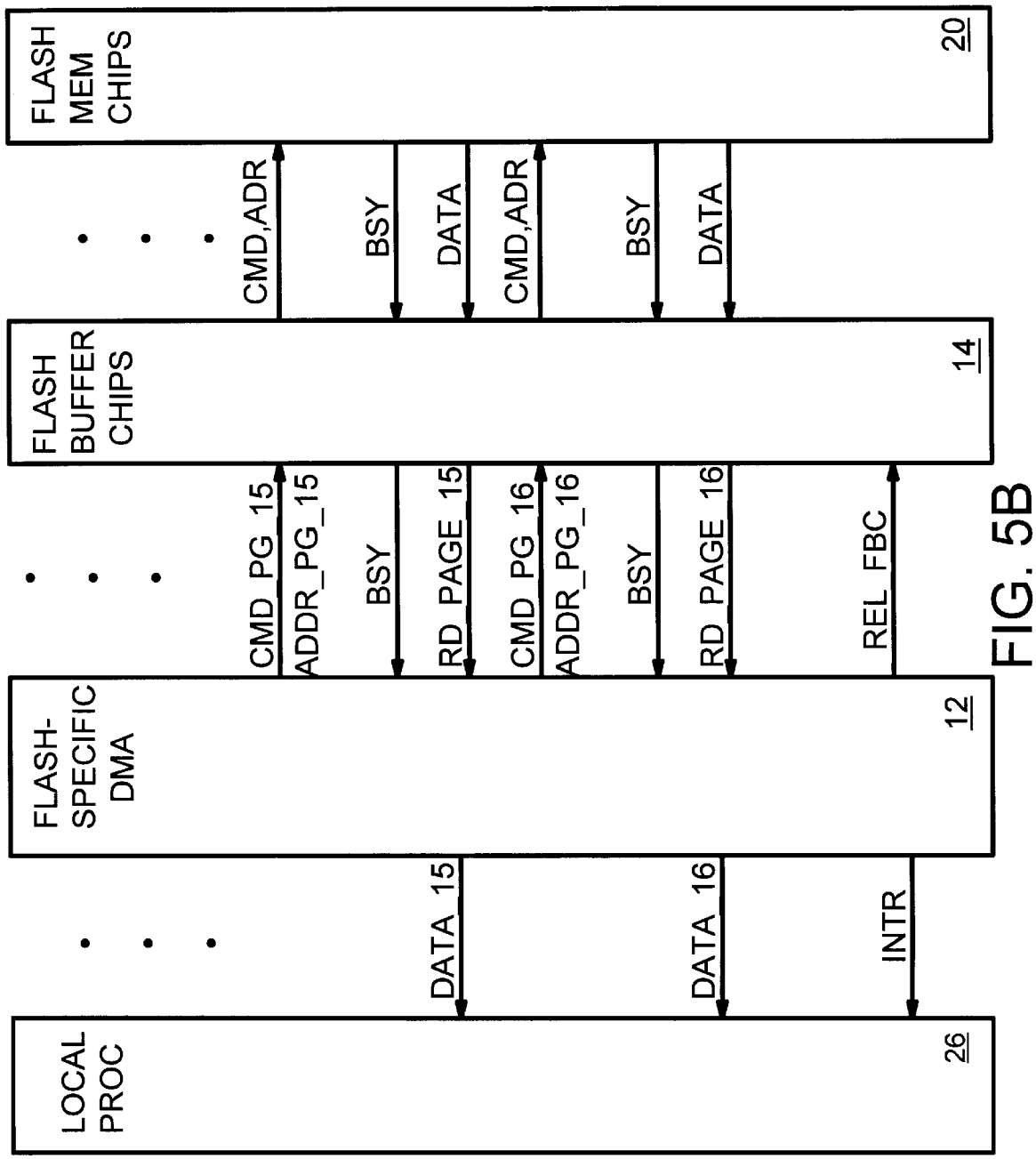

Block Read Converted to Page Reads—FIGS. 5A, 5B

FIGS. 5A, 5B show how a block-read command is converted to a sequence of 16 page reads to the flash-memory chips. In FIG. 5A, the host requests a read of flash memory. Local processor 26 responds by allocating a block in the DRAM cache to receive the data read from the flash memory. Local processor 26 generates a single command, a block read command, that is sent to flash-specific DMA controller 12.

Flash-specific DMA controller 12 responds to the single block-read command by generating a sequence of 16 page-read commands. Each page-read command is a complex sequence of addresses, commands, and data transferred over the flash bus to flash-buffer chips 14. Flash-buffer chips 14 then select one of their flash-memory chips 20 for reading by activating one of the chip-select and other control signals.

DMA controller 12 first sends a request REQ_FBC to select one of the flash-buffer chips 14. The protocol is described in more detail in the co-pending application, "Expandable Flash-Memory Mass-Storage Using Shared Busy Lines and Intermediate Flash-Bus Between Device-Specific Buffers and Flash-Intelligent DMA Controllers", U.S. Ser. No. 08/939,601. Command and address bytes for the first page are then sent to the selected flash-buffer chip 14 and passed on to the selected flash-memory chip 20. Flash-memory chip 20 begins a read operation that takes several milliseconds to complete. Flash-memory chip 20 activates its BUSY signal at the beginning of the read as data is being read from the internal EEPROM array to an internal register. Once the data is ready to be read from flash-memory chip 20, it de-activates BUSY, which is passed through flash-buffer chip 14 to DMA controller 12 preferably using time-division multiplexing as described in the co-pending application.

DMA controller 12 responds to the busy signal being deactivated by reading the 528 data and overhead bytes from flash-memory chip 20 using flash buffer chip 14. This data is written to the DRAM cache and the ECC is checked to generate the syndrome code in place of the ECC code.

Once the 528 bytes from page 1 are written to the DRAM cache, then DMA controller 12 sends command and address bytes for the second page to flash-buffer chip 14 and to flash-memory chip 20. BUSY is again activated while flash-memory chip 20 internally reads the data. Once BUSY is de-activated, the data is read through flash-buffer chip 14 and DMA controller 12 to the DRAM cache. The DMA controller directly transfers the data to the DRAM cache without any involvement from the local processor.

This process of sending command and address bytes to the flash buffer and flash-memory chips, and transferring the data once BUSY is de-asserted, is repeated for the other pages. In FIG. 5B, the last two pages, pages 15 and 16, are transferred. After the data for page 16 is written to the DRAM cache, an interrupt to local processor 26 is generated. Local processor 26 then generates an interrupt to the host, and the host reads the data from the DRAM cache. DMA controller 12 unlocks or releases flash-buffer chip 14 by issuing a REL_FBC command.

The data for different pages can reside on different flash-memory chips, allowing some interleaving or parallel operation to occur. This speeds up reading the block to the DRAM cache. The flash bus and the flash buffer chips can be released by issuing an unlock command (not shown) while one page's flash-memory chip is BUSY. This allows other accesses to occur at the same time, such as for wear-leveling or other operations.

Since flash-memory chips are generally page addressable, it is also possible with the current invention to perform a block transfer as two transfers: a first partial transfer from an intermediate page within the block to the end of the block, and a second partial transfer from the first page in the block to the page preceding the intermediate page. This ordering of transferring pages to the DRAM cache would be preferable when the host desired the intermediate page as soon as possible. This supports a "critical page first" transfer order. This critical-page-first ordering could be done using two high-level commands from the local processor to the DMA controller. As an alternate embodiment, the DMA controller might wrap around from the last page in the block back to the first page in the block, similar to the "critical word first" transfer ordering done from memory systems to microprocessors.

Figure 6:
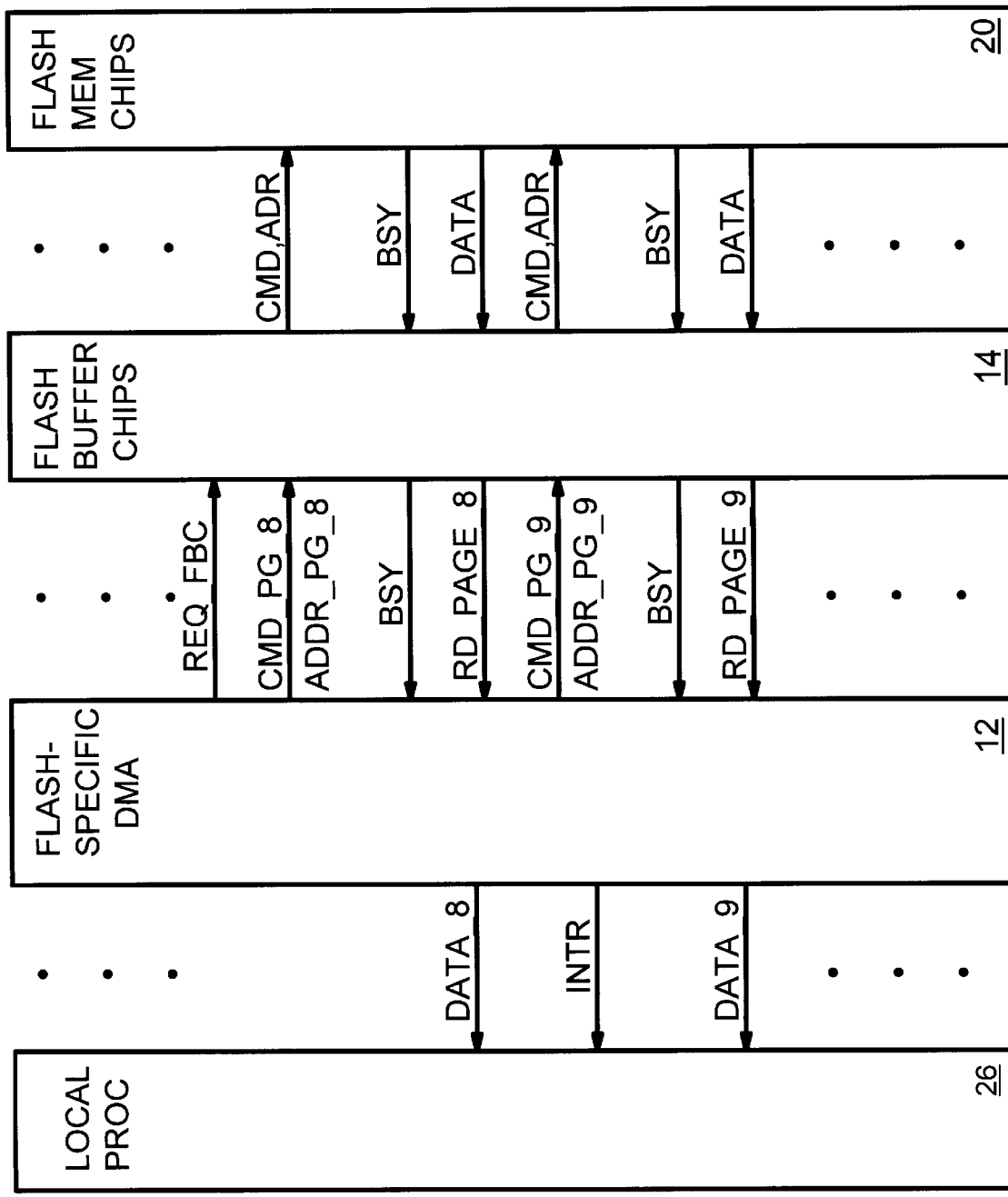
FIG. 6 illustrates an intermediate interrupt generated after the 8$^{th}$ page of a 16-page block has been read.

Intermediate Interrupt—FIG. 6

FIG. 6 illustrates an intermediate interrupt generated after the 8$^{th}$ page of a 16-page block has been read. FIG. 6 occurs in the middle of the sequence of a block read, between FIG. 5A and FIG. 5B in the timing sequence. After pages 1 to 7 have been read, a request for accessing flash buffer chip 14 is generated by DMA controller 12 if the data for page 8 is controlled by a different flash-buffer chip 14, or if flash buffer chip 14 has been released. The command and address bytes for page 8 are generated by DMA controller 12 and sent through flash-buffer chip 14 to flash-memory chip 20, and BUSY is asserted and then de-asserted. The data for page 8 is then transferred to the DRAM cache controlled by local processor 26.

After the data for page 8 has been transferred, an additional intermediate interrupt INTR is generated by DMA controller 12 to local processor 26. This intermediate interrupt indicates that 8 pages of the 16-page block have now been transferred. This intermediate interrupt is useful when the host only needs a portion of the block's data. For example, when the host needs data on page 7, an intermediate interrupt after seven pages have been transferred can be used to inform the local processor to signal the host that the desired data is ready. The host can then be sent page 7 from the DRAM cache prior to the remaining pages being read from the flash-memory chip.

Since the entire block needs to be loaded into the DRAM cache, even when the host requires only one page in the block, the remaining pages continue to be read from flash-memory chips 20 and into the DRAM cache. FIG. 6 shows that the command and address bytes for page 9 are sent from DMA controller 12 to flash buffer chips 14, and the data for page 9 is transferred after the BUSY signal is de-asserted. Pages 10–16 are transferred in a like manner. After page 16 is transferred, the final interrupt is generated by DMA controller 12 to local processor 26, as shown in FIG. 5B.

The intermediate interrupt can be combined with the critical-page-first transfer ordering. The host can be sent any contiguous sequence of pages as soon as they can be read from the flash-memory chips. The remaining pages in the block being read can be transferred to the DRAM cache as a lower priority operation.

Figure 7:
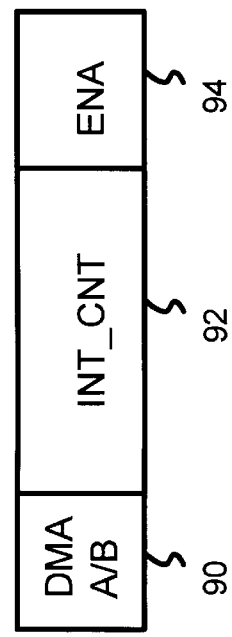
FIG. 7 is a diagram of a programmable register for indicating a number of pages until an interrupt is generated.

Programmable Interrupt—FIG. 7

FIG. 7 is a diagram of a programmable register for indicating a number of pages until an interrupt is generated. The intermediate interrupt of FIG. 6 was generated after half of the pages were read from flash memory to the DRAM cache. However, the number of pages until the intermediate interrupt is generated can be varied. This improves performance since the local processor can notify the host as soon as the desired data in the block is available.

Field 90 selects one of the two DMA controllers 12, 16 and one of the DMA state machines 40 of that controller of FIG. 2 to generate the intermediate interrupt. In the preferred embodiment, only one of the two DMA controllers can be enabled to generate the intermediate interrupt at any time. Count field 92 is a four-bit field that is programmed with the number of pages transferred before the intermediate interrupt is generated. For example, when count field 92 is programmed with 1010, the intermediate interrupt is generated after page 10 of the 16 pages is transferred to the DRAM cache. When count field 92 is programmed with 0011, the intermediate interrupt is generated after page 3 of the 16 pages is transferred to the DRAM cache.

Enable field 94 contains an enable bit. When the enable bit is cleared, the intermediate interrupt is not generated.

Figure 8:
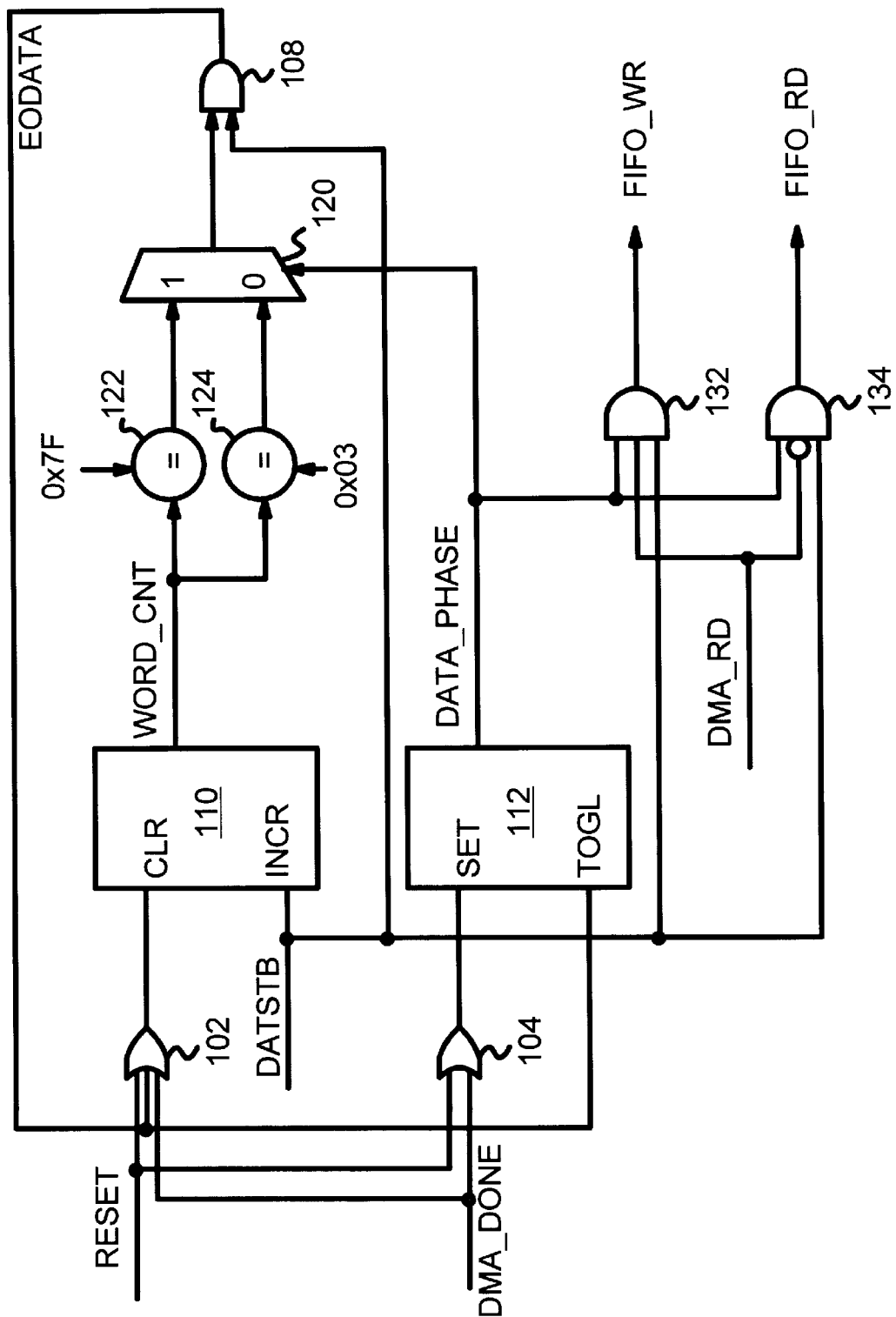
FIG. 8 is a diagram of an overhead-byte generator.

Overhead-Byte Generator—FIG. 8

FIG. 8 is a diagram of an overhead-byte generator. Overhead byte generator 70 generates read and write control signals to host FIFO 80 of FIG. 2. While a DMA transfers a full 528-byte page, including the 16 overhead bytes, only 512 read or write pulses are generated by generator 70 to host FIFO 80. Thus the 16 overhead bytes at the end of each 512-byte page are not written into nor read from host FIFO 80.

The DMA or local processor performing the host transfer generates DATASTB for all 528 bytes of a page, including the overhead bytes. Since internal paths are 32-bits wide rather than byte-wide, DATASTB is generated for every 4 bytes or word. Thus a total of 132 data strobes are generated for the 528-byte page. Incrementer 110 is incremented for every 4-byte word. The word count from incrementer 110 is compared by comparator 122 to one less than the number of words in the data portion of the page, 127 or 0×7F hex. When all 512 data bytes have been transferred, mux 120 passes the match signal from comparator 122 through to gate 108, which generates an end-of-data signal on the next data strobe. The end-of-data signal then clears incrementer 110 and toggles flip-flop 112 so that DATA_PHASE is low. The low DATA_PHASE signal then blocks the FIFO read and write signals at gates 132, 134 while the overhead bytes are transferred.

Incrementer 110 counts from zero to three for the 16 overhead bytes. Then comparator 124 signals a match and mux 120 passes the match signal through to gate 108. Gate 108 again generates the end-of-data signal that clears incrementer 100 and toggles flip-flop 112 so that DATA_PHASE is again high.

OR gates 102, 104 combine the reset and DMA-DONE signals to clear incrementer 110 and set toggle flip-flop 112. DMA-DONE is generated at the end of every DMA block operation to ensure that incrementer 110 and flip-flop 112 are properly initialized.

ADVANTAGES OF THE INVENTION

Management of the 16 overhead bytes for each 512-byte page is transparent to the host, allowing the host to send pages of data that are aligned to powers of 2. Sending aligned data rather than non-aligned data is beneficial to the host and improves transfer and storage efficiency. Flash-memory-system performance is improved by storing the pages as 528-byte pages in the DRAM cache, since the pages merely have to be transferred from the DRAM cache to the flash memory without waiting for the local processor to generate the overhead bytes. Adding and removing overhead bytes transparently allows for larger host DMA transfers without the intervention of firmware on the local processor.

Doing syndrome generation instead of full error correction allows the ECC checkers to be less complex and less expensive. The ECC checkers merely have to detect errors; the repair is performed by the local processor. Since errors are infrequent, the processor can be used to perform complex error correction without a significant performance loss. Having dedicated hardware for the ECC checkers is optimal since all pages must be checked for errors. Only infrequently must the processor be used to repair an error.

Protecting the system overhead field with the same powerful ECC code that is used to protect the host data ensures that the system overhead data receives the same protection as the host data. Because errors are relatively infrequent, this is also the least expensive way to protect the system overhead, rather than separate CRC or ECC fields protecting just the overhead bytes, as in some prior art.

The intermediate interrupt is useful when the host only needs a portion of the block's data. For example, when the host needs data on page 8, the intermediate interrupt can be used to inform the local processor to signal the host that the desired data is ready. The host can then read page 8 from the DRAM cache while the DMA controller completes the transfer of the entire block.

The 16-byte system-overhead field for each flash page stored a physical address pointer to another flash page in prior-art systems. The invention stores a reverse pointer—a logical address rather than a physical address. This LBA is stored in the 16-byte block-pointer field for a block of 16 pages—only one byte per page is used, leaving more bytes for error correction. The additional bytes for error correction allow more errors to be corrected, improving performance and extending device lifetime.

The reverse pointers can be read from flash memory and used by firmware to re-build the unified re-map table when power is restored. The reverse pointers provide a back-up mechanism should the re-map table be stored to a faulty flash block. The reverse pointers can also be used to check the stored re-map table for errors.

Performance is enhanced because two DMA controllers, each with four DMA state machines, are provided. These are able to launch two new flash operations at once for a total of eight independent flash operations in progress at one time. Once launched, flash operations are monitored by the DMA state machines, which receive the busy lines from the flash-memory chips via the flash buffer chips. Thus the DMA controller can launch additional flash operations to other flash-memory chips. This inherent parallelism improves performance by allowing multiple flash operations to be performed at the same time. Indeed, multiple flash operations can be launched or completed at the same time since two DMA controllers are provided.

ALTERNATE EMBODIMENTS

Several other embodiments are contemplated by the inventors. For example other page or block sizes can be substituted, such as 1,024- or 2,048-byte pages, or 8,192- or 16,384-byte blocks. The number of overhead bytes can also be varied. Encodings and error-correcting codes can be varied as well, as can the type of system information stored in the overhead bytes. The DRAM cache could be implemented with other memory technologies, including SRAM or even flash memory.

The system information stored in the overhead bytes in each page could use as little as one byte per page, or it could use multiple bytes per page if some of the ECC bytes are given up.

The intermediate interrupt can be generated on a page-count basis as described, or it could be generated based on the transfer reaching a given page number. Such a scheme could also let a block transfer start at other than the first page, and wrap from the $16^{th}$ page back to the first page.

Multiple intermediate interrupts could be used, one per DMA controller, or perhaps one per DMA state machine. The intermediate interrupts could be signaled to the processor over a single interrupt line to the local processor, requiring the local processor to read status registers to determine the type of interrupt, or the local processor might have multiple, independent interrupt lines.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A flash-memory system that transparently manages system-overhead bytes, the flash-memory system comprising:

a plurality of non-volatile flash-memory chips, each flash-memory chip storing a plurality of blocks of pages, each page having a data portion and system-overhead bytes for the page;

a direct-memory access (DMA) controller for accessing the flash-memory chips by generating commands to the flash-memory chips;

a volatile cache memory for storing pages of data transferred from the flash-memory chips by the DMA controller, the volatile cache memory organized to store the system-overhead bytes for a page with the data portion of the page;

a host interface for receiving commands from a host and for transferring data to the host from the flash-memory system; and an overhead-byte generator, coupled to the host interface, for appending dummy overhead bytes to each page of data from the host, the dummy overhead bytes written to the volatile cache memory as the system-overhead bytes when the data portion of the page is transferred from the host to the volatile cache memory, the overhead-byte generator including stripping means for removing the system-overhead bytes from the page when the page is transferred from the volatile cache memory to the host interface for reading by the host, whereby the system-overhead bytes are stored in the volatile cache memory and in the flash-memory chips but not transferred to or from the host.

2. The flash-memory system of claim 1 wherein the system-overhead bytes comprise:

a system field; and an error-correction code (ECC) field for storing ECC for the data portion of the page.

3. The flash-memory system of claim 2 wherein the system field is located immediately after the data portion of the page, and the ECC stored in the ECC field includes error correction for the data portion and for the system field.

4. The flash-memory system of claim 2 wherein the system fields from each page in a block of pages are combined into a system-block field, the system-block field comprising system information for all pages in the block, whereby system fields from pages in the block are combined to store the system information for the block of pages, but the ECC field for each page stores ECC for the page.

5. The flash-memory system of claim 4 wherein the system information stored in the system-block field comprises:

a write count for indicating a number of writes to a physical block of pages in the flash-memory chips; and an address field for storing an address for the block.

6. The flash-memory system of claim 5 wherein the address field stores a logical-block address (LBA) for the block, the logical-block address being a portion of a logical address used by the host to address the block rather than a physical address of the block used to access the flash-memory chips, whereby the system-overhead bytes store the portion of the logical address rather than a physical address for the block.

7. The flash-memory system of claim 6 wherein the system field of each page is one byte while the ECC field for a page is 15 bytes.

8. The flash-memory system of claim 1 wherein the data portion of the page has a total number of bytes equal to an integer power of 2, while an expanded page including the data portion and the system-overhead bytes has a total number of bytes that is not equal to an integer power of 2, wherein the expanded page is not aligned to powers of 2.

9. The flash-memory system of claim 1 wherein the DMA controller further comprises:

an error-correction code (ECC) checker, receiving the data portion and the system-overhead bytes from the flash-memory chips, for detecting errors in the data portion read from a page in the flash-memory chips;

a syndrome generator, in the ECC checker, for generating a syndrome code indicating whether any error is detected, and for indicating a location of an error within the page when an error is detected; and over-writing means, coupled to the syndrome generator, for overwriting the ECC field in the system-overhead bytes with the syndrome code.

10. The flash-memory system of claim 9 wherein the volatile cache memory stores the syndrome code while the flash-memory chips store the error-correction code (ECC) in the system-overhead bytes for the page.

11. The flash-memory system of claim 10 wherein the DMA controller further comprises:

an ECC generator, receiving the data portion from the volatile cache memory, for generating error-correction code in the ECC field for the data portion of the page when the page is transferred from the volatile cache memory to the flash-memory chips.

12. The flash-memory system of claim 11 further comprising:

a local processor for the flash-memory system, coupled to the volatile cache memory and coupled to the host interface, for controlling the pages stored in the volatile cache memory and for responding to requests from the host.

13. The flash-memory system of claim 12 wherein the local processor includes:

repair means for repairing the error in the data portion of the page using the syndrome code stored in the system-overhead bytes.

14. The flash-memory system of claim 13 wherein the local processor includes a means for generating a single block-read command to the DMA controller, and wherein the DMA controller includes sequencing means for generating a sequence of page-read commands to the flash-memory chips in response to the single block-read command from the local processor.

15. The flash-memory system of claim 14 further comprising: intermediate interrupt means, responsive to the DMA controller, for generating an interrupt to the local processor after some but not all pages in a block have been read from the flash-memory chips to the volatile cache memory.

16. A flash-memory storage peripheral comprising:

a host interface for transferring host pages to and from a host, the host pages having only a data portion;

a local processor for controlling the flash-memory storage peripheral;

a read-only memory (ROM), coupled to the local processor, for storing routines for execution by the local processor, the routines including wear-leveling routines for re-mapping data from over-used or faulty memory blocks to under-used or unused memory blocks;

a cache, coupled to the local processor, for temporarily storing data from the host;

each page stored in the cache having the data portion and an overhead portion, the overhead portion storing wear-leveling information and syndrome code for flash memory;

a plurality of flash-memory chips, arranged into banks, the flash-memory chips being non-volatile semiconductor memory chips that retain data when power is lost, the flash-memory chips including a first flash-memory chip;

a first flash-specific DMA controller, coupled to the local processor, for generating command, address, and data sequences to the first flash-memory chip in a format required by the first flash-memory chip;

a first flash bus, coupled to the first flash-specific DMA controller, for transferring data, address, and commands over shared address/data/command lines;

one or more flash buffer chips, coupled to the first flash bus, for transporting the data, address, and commands between the shared lines of the first flash bus and the flash-memory chips;

wherein the flash-memory chips store blocks of pages, each page having the data portion and the overhead portion, the overhead portion storing wear-leveling information and error-correction code for the page stored in the flash-memory chips, whereby the overhead portion of the page is stored in the flash-memory chips and in the cache, but the overhead portion is not transferred to and from the host.

17. The flash-memory storage peripheral of claim 16 wherein the overhead portion and the data portion of the page are read together by a single command to the flash-memory chips.

18. The flash-memory storage peripheral of claim 17 further comprising:

a second flash-specific DMA controller, coupled to the local processor, for generating command, address, and data sequences to a second flash-memory chip in a format required by the second flash-memory chip;

a second flash bus, coupled to the second flash-specific DMA controller, for transferring the data, address, and commands over shared address/data/command lines;

one or more flash buffer chips, coupled to the second flash bus, for transporting the data, address, and commands between the shared lines of the second flash bus and the second flash-memory chip;

whereby two flash-specific DMA controllers control access of flash-memory chips through flash buffer chips connected by two flash buses.

19. A method of reading data from a non-volatile flash-memory system to a host comprising the steps of:

receiving a request from the host for reading a requested page of flash memory;

generating in a local processor a block-read command to a direct-memory access (DMA) controller for a block containing the requested page;

generating from the DMA controller a sequence of page-read commands to flash-memory chips;

reading a page from a flash-memory chip in response to de-activation of a busy signal from the flash-memory chip for each page-read command;

checking for errors in a data portion of the page from the flash-memory chip by processing the data portion with error-correction code in overhead bytes stored with the page in the flash-memory chip to produce a syndrome code;

over-writing the error-correction code in the overhead bytes with the syndrome code, the syndrome code indicating when an error is detected in the data portion of the page;

storing in a volatile cache memory the data portion and the overhead bytes with the syndrome code for each page read from the flash-memory chips;

transferring the data portion but not the overhead bytes to the host from the volatile cache memory; and signaling the local processor after the requested page has been read to the volatile cache memory but before all pages in the block have been read from the flash-memory chips.

20. The method of claim 19 further comprising repairing an error in the data portion of a page by:

reading the syndrome code in the overhead bytes for the page;

using location information in the syndrome code to locate the error in the data portion of the page; and correcting the error using a processor that reads the location information in the syndrome code.

* * * * *